Jan. 6, 1959
I. L. REQUENES
2,867,296
HYDRAULIC BRAKE SYSTEM
Filed Nov. 22, 1954
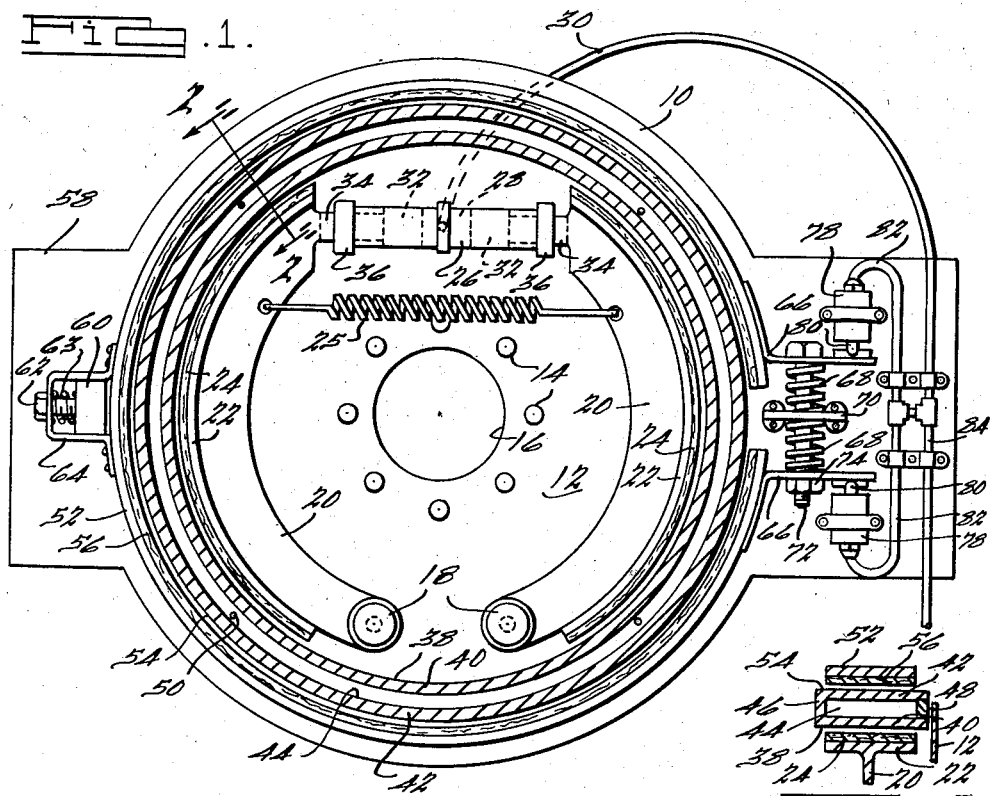
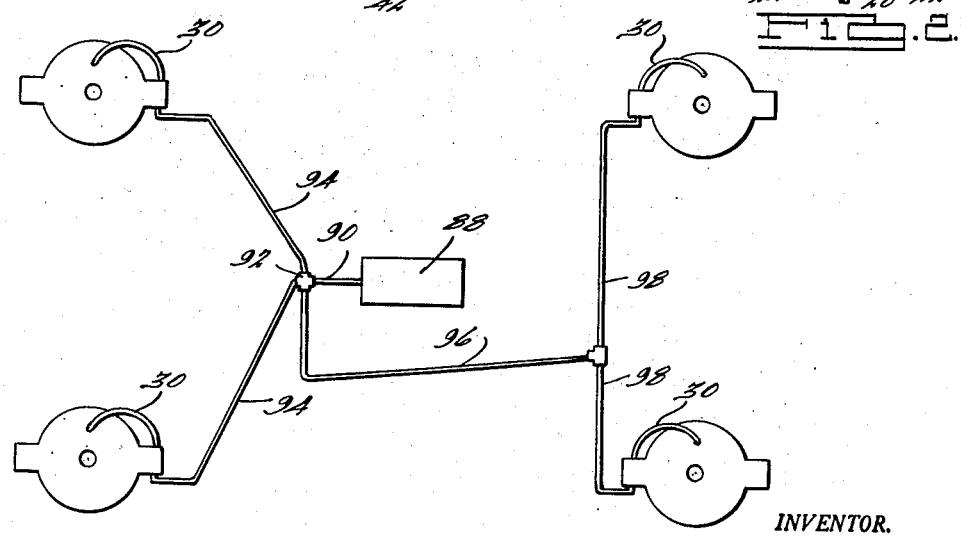
INVENTOR.
Ignacio L. Requenes
BY
Harness, Dickey & Pierce
ATTORNEYS

# United States Patent Office 2,867,296
Patented Jan. 6, 1959

2,867,296

HYDRAULIC BRAKE SYSTEM

Ignacio L. Requenes, Detroit, Mich.

Application November 22, 1954, Serial No. 470,279

2 Claims. (Cl. 188—76)

This invention relates to braking systems and more particularly to hydraulically or pneumatically energized vehicular braking systems.

The object of this invention is to increase the effective frictional force capable of being applied to retard the rotation of a wheel.

A feature of this invention is a means for increasing the area of the effective braking surface on a brake drum without substantial increase in the size of the brake drum.

Another feature of this invention is the provision of an inner set of expansible brake shoes and an outer contractible brake shoe cooperating with a single brake drum, coupled with the provision of means for preventing undue thermal expansion of the drum.

This invention is exemplarily applied as a modification of the conventional hydraulic braking system employed in commercially produced automobiles and trucks. In such systems, the primary limitation upon effective braking, from a mechanical standpoint, has been in the nature and extent of the braking surface between the brake-shoe lining and the brake drum since the extent of the force applied to the brake pedal is limited by the capability of the driver and any substantial increase in the length of brake-pedal travel is not feasible.

Various attempts have been made to overcome braking-system deficiencies, including adding various types of booster or servo mechanisms to increase the effective unit pressures between the brake lining and the brake drum and increasing the area of the braking surface on the lining and drum.

In both cases, however, the increased expansion of the drum as a result of the increased heating has resulted in such a substantial variation in the distance between the lining and the drum that dragging of the brakes occurred or that excessive brake-pedal travel was required.

An improved braking system is obtained in the disclosed system by very substantially increasing the effective braking area while preventing excessive linear expansion of the brake drum. The increase in braking-surface area has been exemplarily accomplished by providing both inner and outer brake shoes, the inner shoes being expansible into engagement with the inner surface of a brake drum, and the outer shoe or band being contractible into engagement with the outer surface of the brake drum. The limiting of the expansion of the drum has been exemplarily accomplished by modifying the drum to include a hollow annular internal chamber filled with an appropriate coolant.

The manner of accomplishment of the foregoing objects and features, and other objects and features of the invention, will be perceived from the following detailed description of an embodiment of the invention when read with reference to the accompanying drawings in which:

Figure 1 is a front elevational sectional view of a brake adapted for association with one wheel of a vehicle and embodying the principles of the invention;

Fig. 2 is a sectional view taken substantially along the line 2—2 of Fig. 1; and Fig. 3 is a schematic representation of a complete braking system associable with a four-wheeled vehicle.

The inventive concept is representatively applied to a hydraulic braking system, and portions of the structure of Fig. 1 are unmodified forms of conventional automotive elements. The braking system for any one wheel includes a shield or housing 10 including a backing plate 12 provided with a plurality of apertures 14 for accepting screws or studs by means of which the apparatus shown in Fig. 1 is attached to the automobile. Backing plate 12 is also provided with a central aperture 16 through which the axle, or equivalent element, of the automobile extends.

Pivotally mounted upon the backing plate 12 by means of anchor pins 18, which may be eccentric, are a pair of internal brake shoes 20 provided with annular flanges 22. Suitable brake linings 24 are riveted or otherwise affixed to the flanges 22 on the brake shoes 20 in the conventional fashion. The brake shoes 20 are normally held in a contracted position by a retracting spring 25. They are actuated by means of a wheel cylinder 26 provided with a chamber 28 into which a hydraulic brake fluid may be forced through a fluid line 30 to act upon a pair of opposing pistons 32 engaging the inner surface of the wall of the cylinder 26. Pistons 32 engage piston stems or rods 34 passing through boots 36 and integral with the brake shoes 20 so that upon the application of a force to the pistons 32 through the medium of the hydraulic brake fluid, the brake shoes 20 are forced outwardly, pivoting about the anchor pins 18. The physical relationships may be appropriately modified to render both shoes so self-energizing, if desired.

The brake lining 24 upon the brake shoes 20 cooperates with the inner surface 38 of a brake drum comprising an inner annulus 40 and an outer annulus 42 so interjoined so as to provide a sealed inner chamber 44. Thus, as may best be seen in the sectional view of Fig. 2 of the drawings, the inner annulus 40 and the outer annulus 42 are interjoined by means of discs 46 and 48 so as to define a hollow annular chamber 44. It is envisioned that the portions 40, 42 and 46 may be integrally formed by a casting operation and that the disc or ring 48 may be inserted and held in place by welding, sweating, or equivalent affixing operation. Any other suitable method of manufacture may be employed wherein the drum has the requisite strength and rigidity and wherein the internal chamber is fluid or liquid tight.

A suitable coolant is placed within the chamber 44 through an orifice 50 with provision being made to plug or seal that orifice after the coolant is placed within the chamber 44. A plurality of orifices 50 and plugs therefor may be provided to obtain dynamic balance.

An annular outer brake shoe or band 52 is mounted exteriorly of and in spaced parallelism with the outer surface 54 of the outer annulus 42 of the brake drum. The outer shoe 52, faced with a brake lining 56, is adjustably mounted upon a mounting plate 58 integral with the shield or housing 10 and with the backing plate 12. Mounting plate 58 is provided with a block 60 internally threaded to accept an adjusting screw 62 the shank of which passes through an aperture in a bracket 64 riveted, welded or otherwise affixed to the outer shoe 52. A compression spring 63 is interposed the bracket 64 and the block 60.

The distance between the brake lining 56 and the outer surface 54 of the brake drum at a point adjacent the block 60 is adjustably controlled by means of the screw 62, rotation of that screw in one direction permitting the bracket 64 to move to the left (Fig. 1) under the impetus of spring 63 thereby to increase the clearance between the lining and the drum, and rotation of the screw 62 in the other direction tending to move the bracket 64 to the right, compressing spring 63, to decrease the distance between the lining 56 and the outer surface 54 of the brake drum.

Diametrically opposite the aforesaid adjustable mounting means for the outer shoe 52 is an additional mounting means for that shoe including a pair of extending arms 66 affixed to the two spaced end portions of the shoe 52 and being so formed as to extend in substantially spaced parallelism with one another. A compression spring 68 in interposed each of the arms 66 and a plate 70 affixed to a portion of the shield or housing 10, those springs tending to force the arms 66 apart. A bolt 72 provided with a nut 74 passes through aligned apertures in the arms 66 and the plate 70 so as to define the maximum degree of separation of the arms 66. Thus, the separated ends of the outer brake shoe 52 are balanced and adjustably positioned relative to the outer surface 54 of the brake drum by means including the springs 68 and the bolt 72, and the other side of the brake shoe 52 is supported with respect to the shield or housing 10 by means including the bolt 62 and the block 60.

The lining 56 on the outer brake shoe or band 52 is forced into engagement with the surface 54 of the brake drum by means of a pair of opposing wheel cylinders 78 provided with internal pistons (not shown) integral with or abutting piston stems or rods 80 affixed to or engaging the arms 66. A hydraulic line 82 is connected to each of the cylinders 78 and the two hydraulic lines 82 communicate with the main feeder line 84. Upon the application of fluid pressure via line 84 and lines 82 to the wheel cylinders 78, the piston stems or rods 80 force the arms 66 towards one another against the resistive force of the springs 68 so as to deform the brake shoe or band 52 to bring the lining 56 into engagement with the surface 54 of the brake drum. The resilient nature of the compression spring 63 permits that portion of the brake lining 56 adjacent the block 60 to be brought into engagement with the surface 54 of the brake drum.

It will therefore be seen that an increase in the pressure applied to the hydraulic fluid in the line 84 will result in forces being exerted to expand the two inner brake shoes 20 to bring the lining 24 into engagement with the inner surface 38 of the inner annulus 40 of the brake drum and to contract the outer brake shoe or band 52 to bring the lining 56 into engagement with the outer surface 54 of the outer annulus 52 of the brake drum. By virtue of this arrangement, without substantially increasing the diameter of the brake drum the effective area of the braking surface has been very substantially increased through the provision of an additional brake drum or band positioned exteriorly of the brake drum. It will be observed from the drawings that the total braking surface has been considerably more than doubled, being increased substantially by a factor of three.

It is of course recognized that the kinetic energy of motion of the automobile must be dissipated in the form of heat when the automobile is stopped. This heat results in a substantial increase in temperature of the brake drum, producing a substantial elongation of the circumference of the drum and hence a substantial increase in the diameter of the drum. Unless means are provided to prevent undue expansion of the drum upon extensive braking, the distance between the inner shoes 20, in their released position, and the inner surface 38 of the brake drum becomes so great that but a reduced portion of the inner brake shoe lining 24 engages the drum; under extreme conditions, the degree of movement of the inner brake shoes 20 is insufficient to establish engagement with the brake drum. Conversely, unless means are provided to prevent such an occurrence, upon extensive braking with the resultant expansion of the brake drum, the distance between the outer brake shoe lining 56 and the outer surface 54 of the brake drum becomes so small that the brakes will drag, or, under extreme conditions, lock.

To prevent improper functioning of the system due to thermal expansion of the brake drum a suitable coolant fluid is placed within the chamber 44 in the brake drum to dissipate the heat generated during braking or at least to dissipate that portion of the heat generated during braking which would otherwise overheat the drum and produce undue expansion of the drum. While the coolant may be either in a solid, liquid or gaseous state at normal ambient temperatures, it has been found to be preferable to employ a liquid having a high heat of vaporization and having a temperature of vaporization greater than normal ambient temperatures but less than the temperature at which the expansion of the brake drum becomes excessive. The temperature of vaporization is preferably below that of water.

If chamber 44 is partially filled with a mixture of motor oil and a compound having the aforesaid characteristics, the mixture will be capable of absorbing the sensible heat developed by the brakes under normal driving conditions to a sufficient degree to prevent undue expansion of the brake drum. Under extreme braking conditions, wherein an abnormal amount of heat is developed, vaporization will or may occur to dissipate the additional heat. It has been found that any of a number of substances may be mixed with motor oil providing the mixture has the requisite characteristics. For example, fluoro-trichloro methane, methylene chloride, dichlorethylene, or trichlorethylene may be employed with the motor oil. Since the coolant itself tends to expand with heat, it is of course advisable to incompletely fill the chamber 44.

A conventional hydraulic system modified to permit the incorporation of the principles of the present invention is shown in Fig. 3 of the drawings. The master cylinder 88 is actuated by a brake pedal and brake linkage (not shown) to force hydraulic brake fluid through the line 90 and the junction 92 to either of the lines 94 leading to the front-wheel brake cylinders and to the line 96 which communicates with either of the lines 98 leading to the rear-wheel cylinders. Each of the lines 94 and 98 finds its equivalent in line 84 in Fig. 1 of the drawings. Line 30 in Fig. 1 of the drawings is similarly identified for each of the wheels in Fig. 3 of the drawings.

While it will be apparent that the embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a braking system, a rotatably mounted brake drum comprising an outer annulus, an inner annulus and a pair of discs interjoining the edges of said annuli to form a hollow chamber in said drum, a shield, a pair of brake shoes independently pivotally mounted on said shield, a hydraulic cylinder mounted on said shield and actuatable to pivot said shoes into engagement with said inner annulus, an annular brake band overlying said outer annulus and having two ends, a pair of arms individually affixed to said ends and extending substantially in spaced parallelism with one another, spring means for forcing said arms apart, means for establishing an adjustable limit to the extent of separation of said arms, a pair of hydraulic cylinders mounted on said shield and actuatable to force said arms towards one another, means engaging said brake band at a point diametrically opposite said ends for resiliently supporting a portion of said brake band in proximity to said outer annulus, hydraulic apparatus for concurrently energizing all of said cylinders, and a normally liquid coolant in said chamber.

2. In a braking system, a rotatably mounted brake drum comprising an outer annulus, an inner annulus and a pair of discs interjoining the edges of said annuli to form a hollow chamber in said drum, a shield, a pair of brake shoes independently pivotally mounted on said shield, a hydraulic cylinder mounted on said shield and actuatable to pivot said shoes into engagement with said inner annulus, an annular brake band overlying said outer annulus and having two ends, a pair of arms individually affixed to said ends and extending substantially in spaced parallelism with one another, spring means for forcing said arms apart, means for establishing an adjustable limit to the extent of separation of said arms, a pair of hydraulic cylinders mounted on said shield and actuatable to force said arms towards one another, means engaging said brake band at a point diametrically opposite said ends for resiliently supporting a portion of said brake band in proximity to said outer annulus, hydraulic apparatus for concurrently energizing all of said cylinders, and a coolant in said chamber, said coolant comprising a mixture of motor oil and a liquid having a temperature of vaporization greater than normal ambient temperatures but less than that of water.

References Cited in the file of this patent

UNITED STATES PATENTS

| | | |
|---|---|---|
| 1,245,040 | Scaife | Oct. 30, 1917 |
| 1,559,583 | Nelson | Nov. 3, 1925 |
| 1,663,147 | Spotz | Mar. 20, 1928 |
| 1,705,046 | Church | Mar. 12, 1929 |
| 1,798,933 | Edgerton | Mar. 31, 1931 |
| 1,845,846 | Norton | Feb. 16, 1932 |
| 1,906,519 | Bloss | May 2, 1933 |
| 1,978,687 | Pearmain et al. | Oct. 30, 1934 |
| 2,008,633 | Yount | July 16, 1935 |
| 2,018,912 | Carroll | Oct. 29, 1935 |
| 2,022,435 | Sanford | Nov. 26, 1935 |
| 2,148,818 | Kattwinkel | Feb. 28, 1939 |
| 2,201,293 | Hoppenstand | May 21, 1940 |
| 2,254,074 | Klaue | Aug. 26, 1941 |
| 2,263,961 | Wilson | Nov. 25, 1941 |
| 2,360,141 | Kenney | Oct. 10, 1944 |
| 2,468,388 | Wilson | Apr. 26, 1949 |